(12) United States Patent
Cheung (10) Patent No.: US 11,526,682 B2
(45) Date of Patent: Dec. 13, 2022

(54) SUBSTRATE WITH ELECTRICALLY CONDUCTIVE PADS THAT ARE READABLE BY TOUCHSCREEN DEVICE

(71) Applicant: Yat Fei Cheung, Hong Kong (CN)

(72) Inventor: Yat Fei Cheung, Hong Kong (CN)

(*) Notice: Subject to any disclaimer, the term of this patent is extended or adjusted under 35 U.S.C. 154(b) by 0 days.

(21) Appl. No.: 16/568,241

(22) Filed: Sep. 11, 2019

(65) Prior Publication Data

US 2021/0073485 A1 Mar. 11, 2021

(51) Int. Cl.
*G06K 7/06* (2006.01)
*G06F 3/044* (2006.01)

(52) U.S. Cl.
CPC .............. *G06K 7/065* (2013.01); *G06F 3/044* (2013.01); *G06F 2203/04101* (2013.01)

(58) Field of Classification Search
CPC .................... G06K 7/065; G06F 3/044; G06F 2203/04101
See application file for complete search history.

(56) References Cited

U.S. PATENT DOCUMENTS

| | | | |
|---|---|---|---|
| 8,497,850 B2 | 7/2013 | Foerster et al. | |
| 9,589,161 B1 | 3/2017 | Lau et al. | |
| 9,715,687 B1 | 7/2017 | Lau et al. | |
| 10,152,616 B2 | 12/2018 | Lo et al. | |
| 10,551,967 B2 | 2/2020 | Ha | |
| 2009/0071694 A1 | 3/2009 | Pawel | |
| 2010/0258639 A1 | 10/2010 | Florek et al. | |
| 2011/0284640 A1 | 11/2011 | Hartwick et al. | |
| 2012/0125993 A1 | 5/2012 | Thiele et al. | |
| 2012/0306813 A1 | 12/2012 | Foerster et al. | |
| 2013/0072303 A1 | 3/2013 | Mineur et al. | |
| 2013/0115878 A1 | 5/2013 | Thiele et al. | |
| 2013/0284578 A1 | 10/2013 | Foerster et al. | |
| 2014/0014489 A1* | 1/2014 | Chen ..................... | G06F 3/044 200/5 A |
| 2014/0111469 A1 | 4/2014 | Foerster et al. | |
| 2014/0120995 A1 | 5/2014 | Duplat et al. | |
| 2014/0152621 A1* | 6/2014 | Okayama .............. | G06F 3/0446 345/174 |
| 2014/0198062 A1 | 7/2014 | Kreutzer et al. | |
| 2015/0013764 A1* | 1/2015 | Matsumura .............. | C09D 7/70 252/514 |

(Continued)

FOREIGN PATENT DOCUMENTS

| | | |
|---|---|---|
| CN | 1378693 A | 11/2002 |
| CN | 1802656 A | 7/2006 |

(Continued)

*Primary Examiner* — Kwang-Su Yang
(74) *Attorney, Agent, or Firm* — Eagle IP Limited (57) ABSTRACT

One example embodiment is a device which includes a non-conductive substrate and at least one touchpoint. The substrate has an external surface. The touchpoint includes a conductive pad disposed on the external surface, and a conductive line that has a first end and a second end. The first end makes electrical contact with the conductive pad and the second end extends spatially away from the first end to a pre-determined distance. When the external surface of the non-conductive substrate is placed in proximity to a touch surface, the conductive pad triggers a touch event on the touch surface such that a coordinate of the conductive pad relative to the touch surface is determined.

17 Claims, 11 Drawing Sheets

(56) References Cited

U.S. PATENT DOCUMENTS

| | | | |
|---|---|---|---|
| 2017/0308781 A1 | 10/2017 | Foerster et al. | |
| 2018/0131373 A1* | 5/2018 | Liu | G06F 3/0414 |
| 2018/0211071 A1* | 7/2018 | Lo | G06F 3/0488 |
| 2018/0329538 A1* | 11/2018 | Hu | G06F 3/0445 |
| 2019/0079617 A1* | 3/2019 | Li | G02F 1/133512 |
| 2019/0187767 A1* | 6/2019 | Li | G06F 3/0414 |
| 2020/0225545 A1* | 7/2020 | Zuo | G02F 1/13458 |
| 2021/0317352 A1* | 10/2021 | Chung | C09J 9/02 |

FOREIGN PATENT DOCUMENTS

| | | |
|---|---|---|
| CN | 1820287 A | 8/2006 |
| CN | 102066082 A | 5/2011 |
| CN | 102187349 A | 9/2011 |
| CN | 103038784 A | 4/2013 |
| CN | 103250164 A | 8/2013 |
| CN | 103733164 A | 4/2014 |
| CN | 104021740 | 9/2014 |
| CN | 104123644 | 10/2014 |
| CN | 104123644 A | 10/2014 |
| CN | 104267863 A | 1/2015 |
| CN | 204331699 U | 5/2015 |
| CN | 105308522 A | 2/2016 |
| CN | 107249703 A | 10/2017 |
| CN | 109416723 A | 3/2019 |
| EP | 2458526 A1 | 5/2012 |
| JP | 2013089013 A | 5/2013 |
| JP | 2015197767 A | 11/2015 |
| WO | 2012072648 A1 | 6/2012 |
| WO | 2012095586 A1 | 7/2012 |
| WO | 2012095587 A1 | 7/2012 |
| WO | 2013107957 A1 | 7/2013 |

\* cited by examiner

SUBSTRATE WITH ELECTRICALLY CONDUCTIVE PADS THAT ARE READABLE BY TOUCHSCREEN DEVICE

FIELD OF INVENTION

The present invention relates to a device that include a substrate with electrically conductive pads that are readable by touchscreen device.

BACKGROUND OF INVENTION

Touch screen technology have been widely used as an input method as a way to capture user's gesture when the user uses his or her finger to draw or tap on the touch screen. Recently, there have been developments in storing information in electronic cards and electronic devices, and transmitting the information to a computer or a mobile device when the card or device is in close proximity to the touch screen. As the prevalent touch screen technology uses capacitive sensing to detect the change of capacitance when the user's finger touches the touch screen, many existing solutions require that the card or device must be touched by a human finger in order that the change of capacitance can be sensed by the touch screen. This may not be convenient to the user.

New methods and devices that transmit information between the devices and electronic devices with touch screens without the need of human touch will assist in advancing technological needs and solving technological problems.

SUMMARY OF INVENTION

One example embodiment is a device which includes a non-conductive substrate and at least one touchpoint. The substrate has an external surface. The touchpoint includes a conductive pad disposed on the external surface, and a conductive line that has a first end and a second end. The first end makes electrical contact with the conductive pad and the second end extends spatially away from the first end to a pre-determined distance. When the external surface of the non-conductive substrate is placed in proximity to a touch surface, the conductive pad triggers a touch event on the touch surface such that a coordinate of the conductive pad relative to the touch surface is determined.

Another example embodiment is an object that includes a non-conductive substrate having an external surface, a number of conductive pads that are on the external surface of the non-conductive substrate, a number of conductive lines that are disposed at the opposite side of the external surface. Each conductive line has two ends. Each end of one conductive line connects one conductive pad so that each conductive pad is electrically interconnected with one another. Each conductive pad triggers a touch event when the external surface of the non-conductive substrate is placed in proximity to a touch surface such that a geometric pattern formed by the geometric arrangement of all conductive pads can be identified based on the coordinates of the conductive pads on the touch surface.

Another example embodiment is a method executed by a reader to identify an object. The object includes a non-conductive substrate that has a first surface and a second surface opposite to the first surface. A number of conductive pads are disposed on the first surface. Each conductive pad in the object is connected to one or more conductive lines on the second surface through a conductive via that extends from the first surface to the second surface. The method includes determining coordinates of the conductive pads by the reader when the first surface is placed in proximity to the surface of the touch screen display of the reader, extracting a geometric pattern formed by the geometric arrangement of the plurality of conductive pads on the first surface of the non-conductive substrate by the reader, and determining the identity of the object based on the geometric pattern by the reader.

Other example embodiments are discussed herein.

DETAILED DESCRIPTION

Example embodiments relate to a method and a device that enable the communication between the device and a reader with a touch screen.

Touch screen devices are widely deployed in electronic devices such as game consoles, personal computers, tablet computers, electronic voting machines, and smartphones. The touch screen device allow the user to perform various functions by touching the touch screen with a finger. The touch screen device recognizes the user's touch and determine the position of the touch on the touch screen. The processor of the touch screen device can then interpret the touch in accordance with the display appearing at the time of the touch, and thereafter can perform one or more actions based on the touch.

Typical touch screen devices use projective mutual capacitance to determine touches. In an embodiment, one set of grid wires are deposited on top of another set of grid wires. The two sets of grid-wires are arranged in mutually perpendicular directions, i.e. X and Y directions, and they are separated by a non-conductive substrate so they are not in contact with each other. As such, the intersection of each pair of X-Y grid wire forms a capacitor. At any given time, one wire from each of the X and Y grid is activated by a voltage. At the intersection of the activated wires, an electric field is formed, and electric charges are accumulated at the intersection. The accumulated electric charge can be measured by a detection circuit as a capacitive value. The number of capacitive X-Y grid locations or intersections on the touch screen can vary, depending on the type and size of the touch screen display. When a finger is placed near the intersection of the activated wires on the touch screen, it alters the aforementioned electric field thereof as the finger acts as a capacitor in parallel to the ground. This changes the effective capacitance and hence triggers a touch event.

There have been development of electronic cards containing conductive pads which could be detected by a touch screen of an electronic device via capacitive coupling. However, an area of the card, which is connected with all the conductive pads, need to be reserved for the user's finger to touch so that the conductive pads can trigger touch events. This is inconvenient for the users because they have to physically keep their finger contacting with the reserved area.

Example embodiments solve these problems by introducing a device including a substrate and some conductive pads, which can trigger touch events on the touch screen without the need for a user to be in constant physical contact with the device. When the conductive pads on the device are in contact with or in close proximity to the touch screen, those conductive pads that are near the activated X-Y grid wires will distort the electric field generated by this pair of grid wires. Such distortion changes the accumulated electrical charge at the intersection of the activated grid wires. This change causes a change of the capacitive value that is measurable by a detection circuit in the touch device. If the change is big enough, a touch event will be generated. Based on the X-Y coordinates of the activated grid wires, the location of conductive pad that generates the touch event can then by inferred.

An example embodiment is a device that includes a non-conductive substrate and a touchpoint. The substrate comprises an external surface. The touchpoint comprises a conductive pad disposed on the external surface of the substrate, and a conductive line disposed at the opposite side of the external surface. The conductive line makes electrical contact with the conductive pad. When the external surface of the non-conductive substrate is placed in proximity to a touch surface, the conductive pad triggers a touch event on the touch surface such that a coordinate of the conductive pad relative to the touch surface is determined.

Another example embodiment is an object that includes a non-conductive substrate, a plurality of conductive pads, and a plurality of conductive lines. The non-conductive substrate comprises an external surface. The conductive pads are disposed on the external surface of the substrate. The conductive lines are disposed at the opposite side of the external surface, and each conductive line has two ends. Each end of the conductive lines is connected with one conductive pad so that each conductive pad is electrically connected with one another. When the external surface of the substrate is placed in proximity to a touch surface, each conductive pad triggers a touch event such that a geometric pattern formed by the geometric arrangement of all conductive pads can be identified based on the coordinates of the conductive pads on the touch surface. The geometric pattern formed by conductive pads corresponds to a unique identification of the object.

In one example embodiment, the object includes one or more switches, so that the pattern is changeable when the switches switch between the open state and the closed state. The geometric pattern can be used as an identity of the card. Hence, a user is thus able to change an identity of the object by turning on and off one or more switches.

An example embodiment is a method executed by a reader to identify an object. The object includes a non-conductive substrate that has a first surface and a second surface opposite to the first surface. A plurality of conductive pads is disposed on the first surface of the non-conductive substrate. Each conductive pad is connected to one or more conductive lines on the second surface through a conductive via that extends from the first surface to the second surface. The method includes determining coordinates of the conductive pads by the reader when the first surface is placed in proximity to the surface of the touch screen display of the reader, extracting a geometric pattern formed by the geometric arrangement of the plurality of conductive pads on the first surface of the non-conductive substrate by the reader, and determining the identity of the object based on the geometric pattern by the reader.

Example embodiments provides a general solution for a simple device or object to interact with a touchscreen without the need for a human to place his or her finger, or any part of the human body to touch this device or object. The solution does not need to employ any additional detection circuit at the touchscreen device. It only needs to make sure that when designing configurations and geometric placements of the conductive pads and their corresponding wirings on the device or object, certain design rules must be followed. As such, it only involves careful planning during the design stage of the device or object. And it works with all existing touchscreen devices. With switches and possibly a microprocessor with memory incorporated to the device or object, it can generate a variety of geometric patterns readable by the touchscreen, thus conveying multiple messages to the touchscreen. These messages may be used to identify the device or object, or to convey specific information to the touchscreen, all without the need for the person to touch the device or object.

In the following description, same numberings are employed to illustrate the same components in different figures.

Figure 1A:
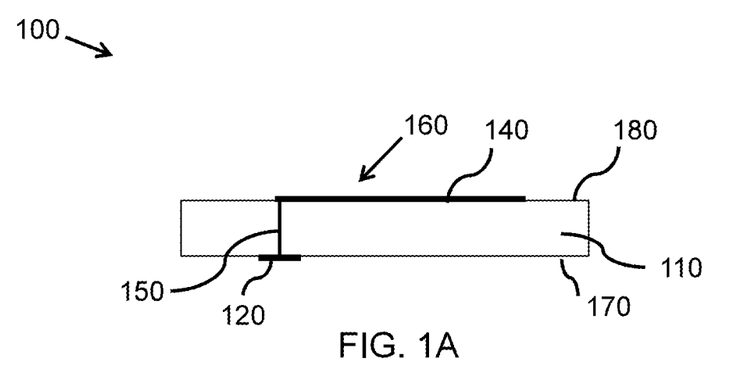
FIG. 1A shows a cross sectional view of a card with a touchpoint in accordance with an example embodiment.
Figure 1B:
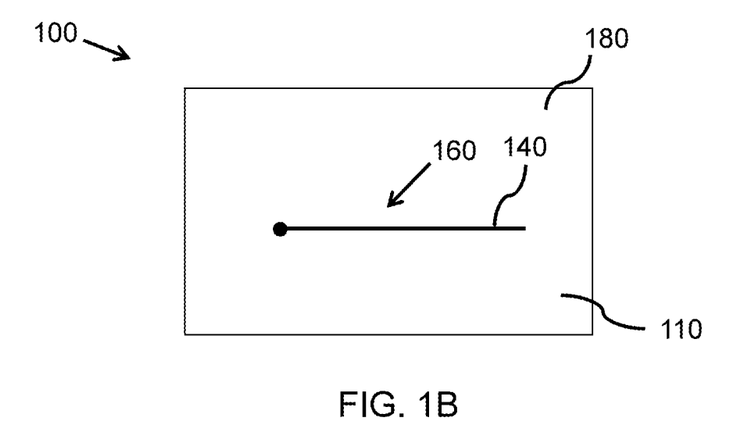
FIG. 1B shows a top view of a card with a touchpoint in accordance with an example embodiment.
Figure 1C:
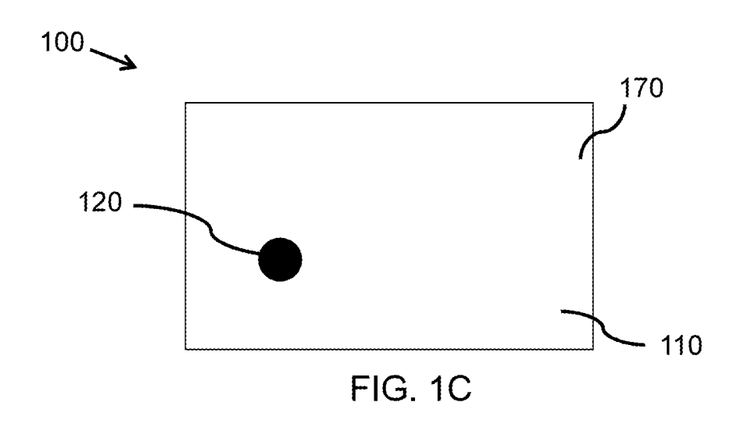
FIG. 1C shows a bottom view of a card with a touchpoint in accordance with an example embodiment.

FIG. 1A shows a cross sectional view of a card 100 with a touchpoint 160 in accordance with an example embodiment. FIG. 1B shows a top view of a card 100 with a touchpoint 160 as shown in FIG. 1A. FIG. 1C shows a bottom view of a card 100 with a touchpoint shown in FIG. 1A.

The card 100 includes an electrically non-conductive substrate 110 that comprises a first surface 170 and a second surface 180 opposite to the first surface 170, and a touchpoint 160. The touchpoint comprises a conductive pad 120 disposed on the first surface 170 of the substrate 110, a conductive line 140 having a first end and a second end and disposed on the second surface 180 of the substrate 110, and conductive via 150 that extends through the substrate 110 and connects the conductive pad 120 with the first end of the conductive line 140. The second end of the conductive line 140 extends a pre-determined distance away from the first end.

Figure 2A:
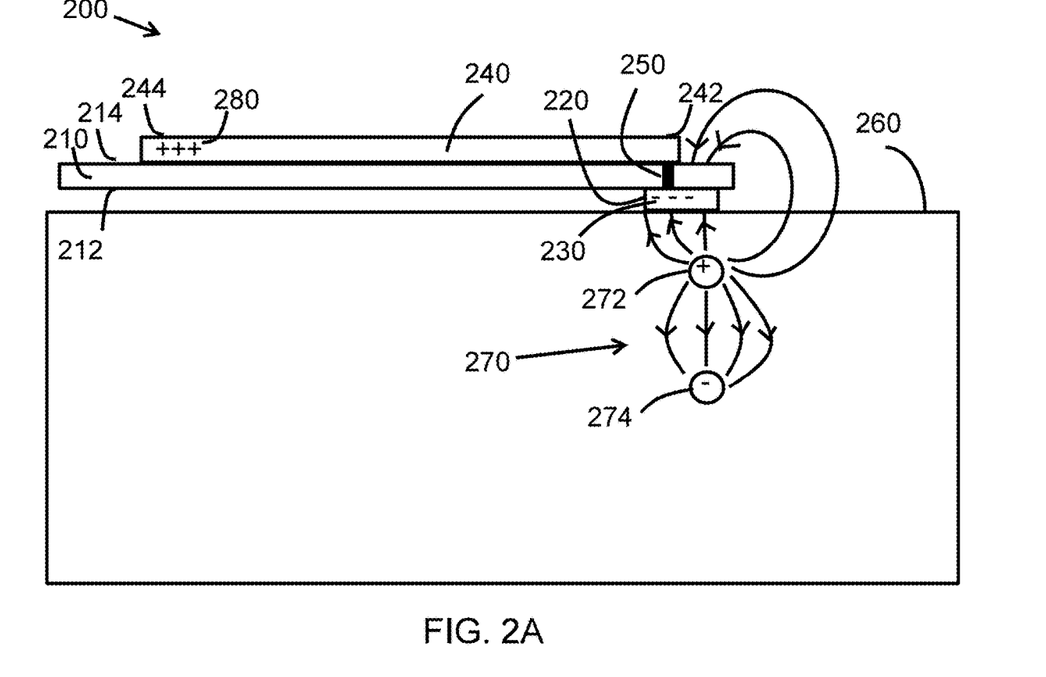
FIG. 2A shows a cross sectional view of a substrate with a touchpoint interacting with a touch screen device in accordance with an example embodiment.

FIG. 2A shows a cross sectional view 200 of a substrate with a touchpoint interacting with a touch screen device in accordance with an example embodiment. In FIG. 2A, the conductive pad 220 is disposed on a first surface 212 of the non-conductive substrate 210. The conductive line 240 has a first end 242 and a second end 244 and is disposed on a second surface 214 opposite to the first surface 212 of the non-conductive substrate 210. The first end 242 of the conductive line 240 connects with the conductive pad 220 through the conductive via 250 that extends through the substrate 210.

As shown in FIG. 2A, when the substrate 210 is placed in proximity to a touch screen device 260, the negative charges 230 is induced to be accumulated in the conductive pad 220, and the positive charge 280 is pushed away to the second end 244 of the conductive line 240. As a result, the electric field 270 at the intersection of the activated wires 272 and 274 on the touch screen 260 in proximity to the conductive pad 220 is changed. The conductive pad 220 disturbs the electric field 270 on the touch screen, induces more charges accumulated at intersection, and triggers a touch event. For example, the electric field 270 attracts negative charges 230 to accumulate inside the conductive pad 220. Since the touch point (the conductive pad, the conductive via and the conductive line assembly) is electrically neutral, the positive charge 280 is repelled as far as possible to the second end 244 of the conductive line 240. The attracted charges, in turn, distorts the electric field and hence induces more charges, which ultimately trigger a touch event on the touch screen 260.

By way of example, the conductive line is a metallic wiring to direct the charges away from the conductive pad. The conductive pad, conductive via and conductive lines can be made of conductive materials such as metals and/or high relative permittivity materials. The permittivity measures how electrically polarized a material can be under the influence of an electric field. Therefore, more polarized materials can better separate the positive and negative charges, which can better induce touch events at the intersection points. Examples of a conductive material include, but are not limited to copper, silver, gold, aluminum, zinc, nickel, brass, conductive ink, and other conductive material such as other metals, graphite, polymers, and semiconductors.

To trigger a touch event on the touch screen 260, the conductive line 240 is required to extend to a distance that is far away enough from the first end 242.

Figure 2B:
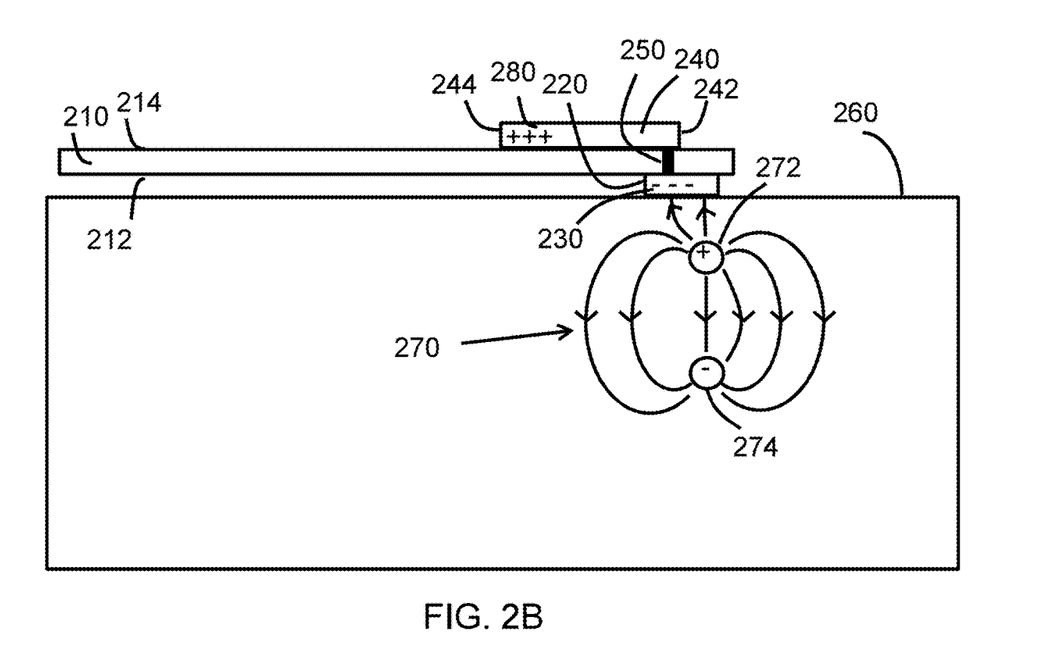
FIG. 2B shows a cross sectional view of a substrate with a touchpoint interacting with a touch screen device in accordance with an example embodiment.

FIG. 2B shows a cross sectional view of a substrate 200 with a touchpoint interacting with a touch screen device 260 in accordance with an example embodiment.

As shown in FIG. 2B, if the dimension of the conductive line 240 is not large enough compared with the spread of the electric field 270, the induced positive charges 280 are not sufficiently separated from the induced negative charges 230. As a result, the electric field 270 is minimally distorted, and thus not triggering a touch event on the touch screen 260.

The dimension of the conductive line 240 for an effective triggering is related to the spatial resolution of grid wires of the touch screen 260 and the dimension of the conductive pad 220. The higher the resolution of the touch screen and the larger the dimensions of the conductive pads, the smaller the dimension of the conductive line is required.

In one example embodiment, the conductive line is a straight line. The length of the conductive line on the non-conductive substrate is at least 1 cm, and the width of the conductive line is at least 0.1 mm. The conductive pad is in a circular shape that has a diameter of at least 6 mm. As mentioned above, it is possible that a smaller dimension of the conductive line or the conductive pad is effective with the advancement in technology which enables a higher capacitive grid resolution of the touch screen.

Figure 3A:
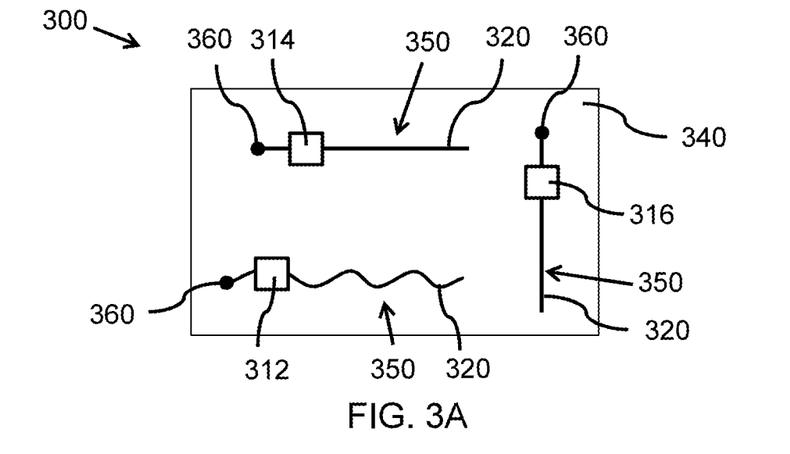
FIG. 3A shows a top view of a substrate with a plurality of touchpoints and switches in accordance with an example embodiment.

FIG. 3A shows a top view 300 of a substrate with a plurality of touchpoints and switches in accordance with an example embodiment.

In FIG. 3A, the substrate 340 includes three touchpoints 350. Each touchpoint 350 comprises a conductive line 320 disposed on the surface of the substrate 340, and a conductive via 360 that extends through the substrate 340 and connects the conductive line 320 with a conductive pad disposed on the other surface of the substrate 340 (not shown) that is described in FIG. 3B below.

By way of example, the conductive lines 320 can be of various shapes, which include but are not limited to, straight, curved, wavy, zigzag, spiral, irregular and any other types. By way of example, the conductive lines can be disposed on the surface of the substrate 340 in any geometrical orientation.

In this and other example embodiments discussed below, the surface of the substrate 340 that the conductive pad disposed on is also referred to as "the first surface" or "the bottom surface" or "the external surface", and the other surface that the conductive line 320 disposed on is also referred to as "the second surface" or "the top surface".

In an example embodiment, touchpoints 350 further comprises switches 312, 314 and 316. Each of the switches is connected between the first end and the second end of the conductive line 320 and near the first end. The switches 312, 314 and 316 are switchable between an open state and a closed state. When the switches are in the closed state, the overall length of the conductive line is long enough so that the conductive pad triggers the touch event when the card is placed on the touch surface. On the other hand, when the switches are in the open state, the conductive pad does not trigger the touch event on the touch surface as the effective conductive line is cut short.

In another example embodiment, each touchpoint 350 on the substrate 340 includes a switch optionally.

In one example embodiment, the switches include, but are not limited to, one or more of bipolar junction transistors (BJT), field effect transistors (FET), micro-electromechanical system (MEMS), optoelectronic switches, digital or mechanical relays, and any other switch mechanism that enables and disables electric current or voltage flow.

Figure 3B:
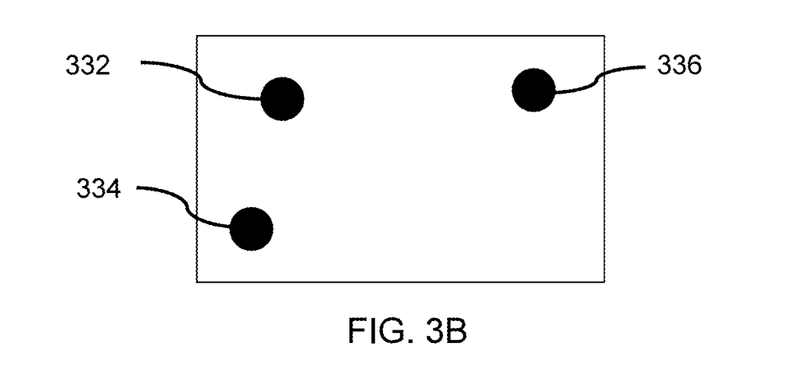
FIG. 3B shows conductive pads detectable by a touch surface when all switches in FIG. 3A are in closed state in accordance with an example embodiment.

FIG. 3B shows conductive pads 332, 334 and 336 detectable by a touch surface when all switches 312, 314 and 316 in FIG. 3A are in closed state in accordance with an example embodiment. Each of the conductive pads is connected with one of the conductive lines 320 by one of the conductive vias 360 in FIG. 3A.

Figure 3C:
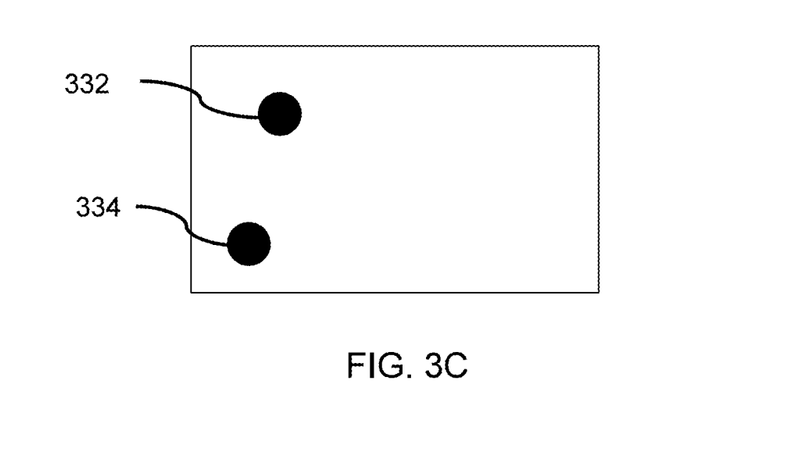
FIG. 3C shows conductive pads detectable by a touch surface when one switch in FIG. 3A is in open state in accordance with an example embodiment.

FIG. 3C shows conductive pads 332 and 334 detectable by a touch surface when switch 316 in FIG. 3A is in open state, while switches 312 and 314 are in the closed state in accordance with an example embodiment. In contrast to FIG. 3A, the conductive pad 336 as shown in FIG. 3B are not detectable by the touch surface. As such, the switches can change a geometrical pattern formed by geometrical arrangement of the conductive pads and read by the touch surface.

In one example embodiment, open and closed states of each switch represent different patterns of the substrate. Each pattern corresponds to a unique identification of the substrate. Consider an example in which the substrate is a handheld portable card. The card is programmable to include particular information (such as information stored and retrieved in response to reading an identity of the card), certain rights or privileges (such as access rights or access privileges to an electronic device), user authentication, etc. By changing the pattern through the switches, more than one identification or unique set of information can be stored in or associated with the same card. A single card can thus have a higher data storing capacity.

In one example embodiment, the substrate further includes a processor that is connected to one or more switches. The processor is configured to send control signals to each switch for switching between open and closed states and vice versa.

Figure 4A:
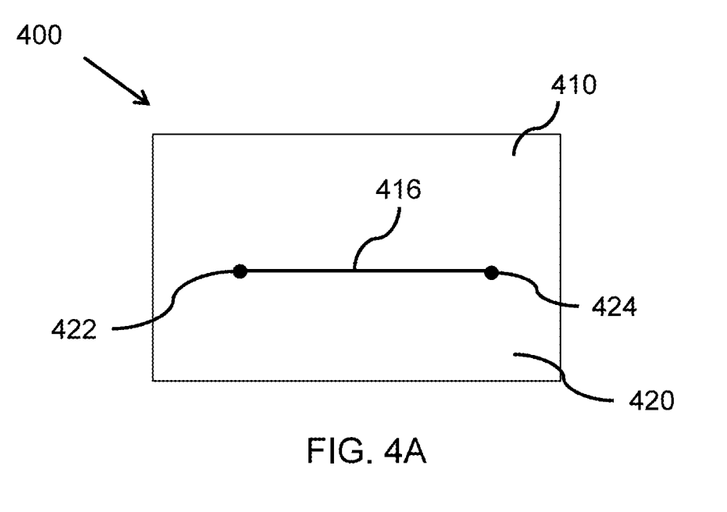
FIG. 4A shows a top view of an object in accordance with an example embodiment.
Figure 4B:
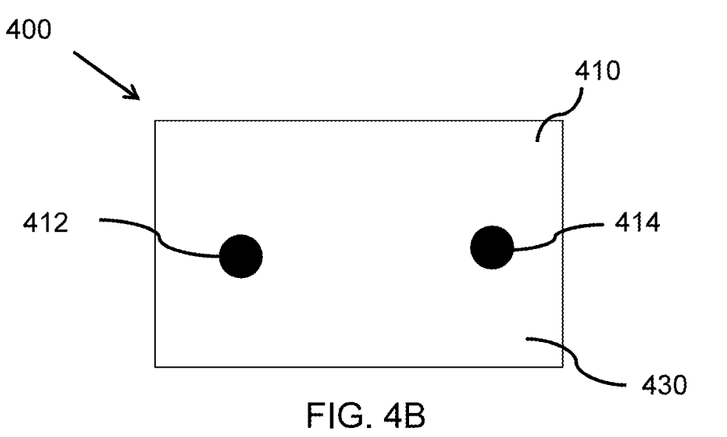
FIG. 4B shows a bottom view of the object as shown in FIG. 4A.

FIG. 4A shows a top view of an object 400 with a conductive line 416 and two conductive vias 422 and 424 in accordance with an example embodiment. FIG. 4B shows a bottom view of the object 400 with two conductive pads 412 and 414 connected to the conductive line 416 via conductive vias 422 and 424 as shown in FIG. 4A.

The object 400 includes non-conductive substrate 410, two conductive pads 412 and 414, a conductive line 416 and two conductive vias 422 and 424. The non-conductive substrate 410 comprises a top surface 420 and a bottom surface 430 opposite to the top surface. The conductive pads 412 and 414 are disposed on bottom surface 430. The conductive line 416 is disposed on the top surface 420 and has two ends. The conductive via 422 extends through the substrate 410 and connects one end of the conductive line 416 with the conductive pad 412. The conductive via 424 extends through the substrate 410 and connects another end of the conductive line 416 with the conductive pad 414. As a result, each of the conductive pads 412 and 414 is electrically connected with one another.

Figure 4C:
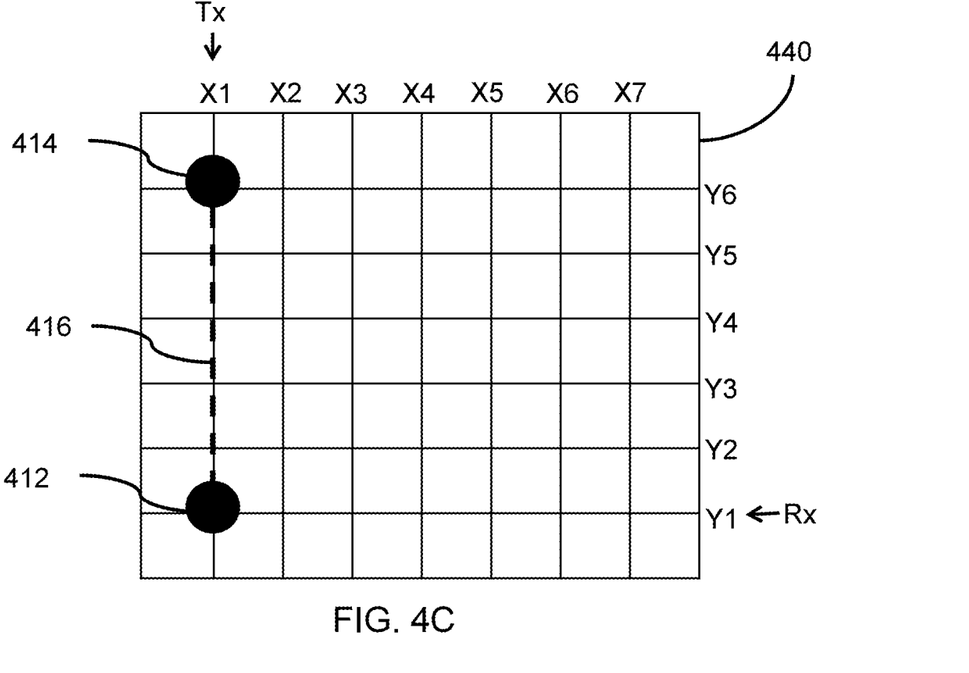
FIG. 4C shows an arrangement of an object with two conductive pads on a touch surface in accordance with an example embodiment.

FIG. 4C shows an arrangement of two conductive pads 412 and 414 on the touch surface in accordance with an example embodiment.

In FIG. 4C, the object 400 as described in FIGS. 4A and 4B is placed in proximity to a touch surface 440 in the coordinates as illustrated. The conductive line 416 as described in FIG. 4A is shown here as a dotted line to illustrate that it is actually disposed on different surface from the conductive pads 412 and 414. The touch surface 440 has a number of grid wires in two mutually perpendicular directions, i.e. X direction (X1 to X7) and Y direction (Y1 to Y6).

As discussed earlier, these grid wires are scanned in both directions sequentially and repetitively by an activate voltage signal, and simultaneously, these grid wires are connected to a detection circuit (not shown) to detect any voltage change caused by the change of capacitance. If the change is higher than a pre-determined threshold, a triggering event is generated.

When both conductive pads 412 and 414 are located on the same X1 grid as illustrated, both conductive pads 412 and 414 cannot be detected by the touch surface 400. It is observed that when grid wires X1 and Y1 are activated, charges are created at conductive pad 412 as mentioned above. In this case, the opposite charges are pushed to the conductive pad 414 in principle. However, since the conductive line 416 aligns approximately along the X1 line, this line does not sense any voltage difference and the conductive pad 414 does not contain opposite charges to pad 412. Rather, it induces the same type of charges as 412 and the net effect is that there is no accumulated net charge at pad 412 and 414. Hence the detection circuit does not sense any change of voltage difference.

Figure 4D:
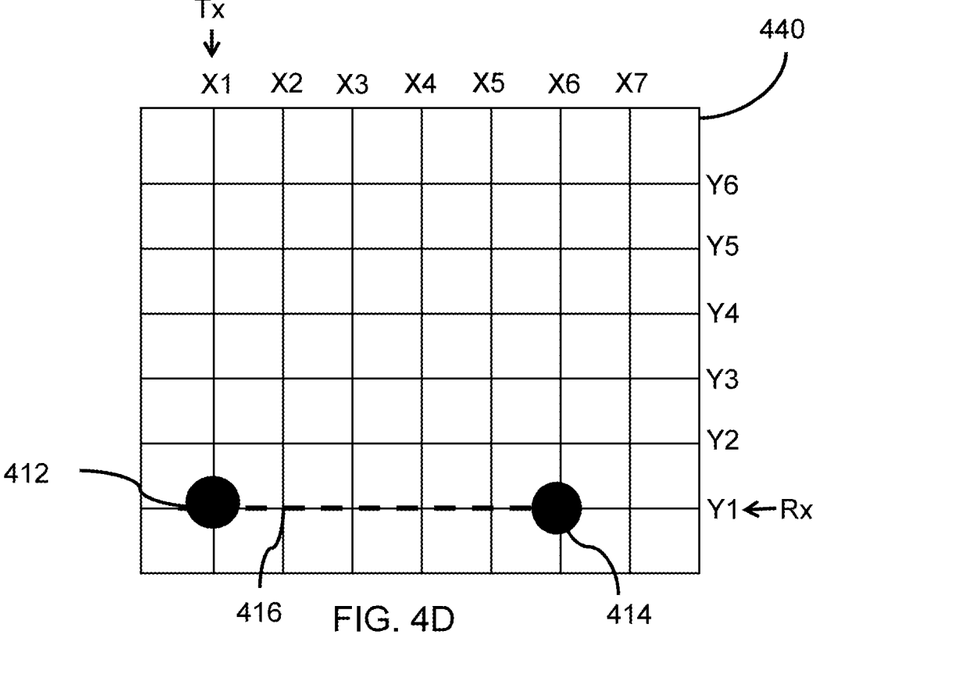
FIG. 4D shows an arrangement of an object with two conductive pads on a touch surface in accordance with an example embodiment.

FIG. 4D shows another arrangement of two conductive pads 412 and 414 on the touch surface 440 in accordance with an example embodiment.

In FIG. 4D, the object 400 as described in FIGS. 4A and 4B is placed in proximity to a touch surface 440 in the coordinates as illustrated. Both conductive pads 412 and 414 are located on the same Y1 grid as illustrated. In this situation, both conductive pads 412 and 414 cannot be detected by the touch surface due to the same observation as mentioned above.

Except for the situation described in FIG. 4C and FIG. 4D, as long as the conductive line that connects two conductive pads does not align with the grid of the touch surface, both of the two conductive pads can be detected by the touch surface.

Figure 4E:
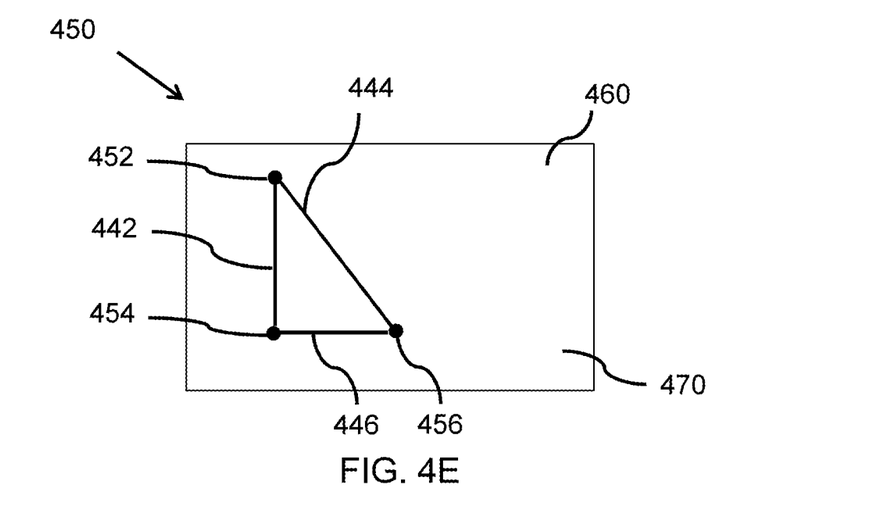
FIG. 4E shows a top view of an object with three conductive lines and three conductive vias in accordance with an example embodiment.
Figure 4F:
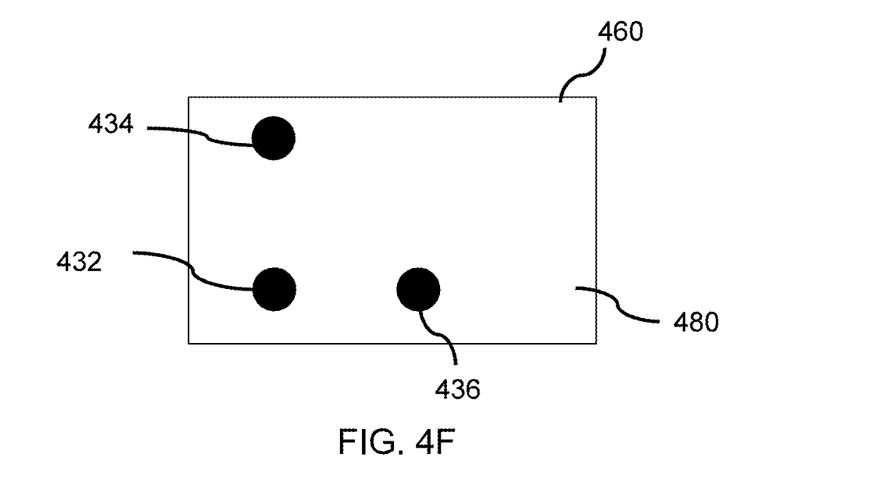
FIG. 4F shows a bottom view of the object as shown in FIG. 4E.

FIGS. 4E and 4F show three conductive pads 432, 434 and 436 interconnected with each other by three conductive lines 442, 444 and 446 via conductive vias 452, 454 and 456 in accordance with an example embodiment. FIG. 4E shows the top surface of the card while FIG. 4F shows the bottom side of the same card.

The object 450 includes non-conductive substrate 460, three conductive pads 432, 434 and 436, three conductive lines 442, 444 and 446, and three conductive vias 452, 454 and 456. The non-conductive substrate 460 comprises a top surface 470 and a bottom surface 480 opposite to the top surface. The conductive pads 432, 434 and 436 are disposed on bottom surface 480. The conductive lines 442, 444 and 446 are disposed on the top surface 470 and each of them has two ends. The conductive vias 432, 454 and 456 extends through the substrate 460. The conductive via 452 connects one end of the conductive line 442 and one end of the conductive line 444 with the conductive pad 434. The conductive via 454 connects another end of the conductive line 442 and one end of the conductive line 446 with the conductive pad 432. The conductive via 456 connects another end of the conductive line 444 and another end of the conductive line 446 with the conductive pad 436. Conductive line 442 connects conductive pad 432 with conductive pad 434. Conductive line 444 connects conductive pad 434 with conductive pad 436. Conductive line 446 connects conductive pad and conductive pad 436. The angle formed by the conductive line 442 and conductive line 446 is degree. As a result, the conductive pads 432, 434 and 436 are electrically connected with one another.

Figure 4G:
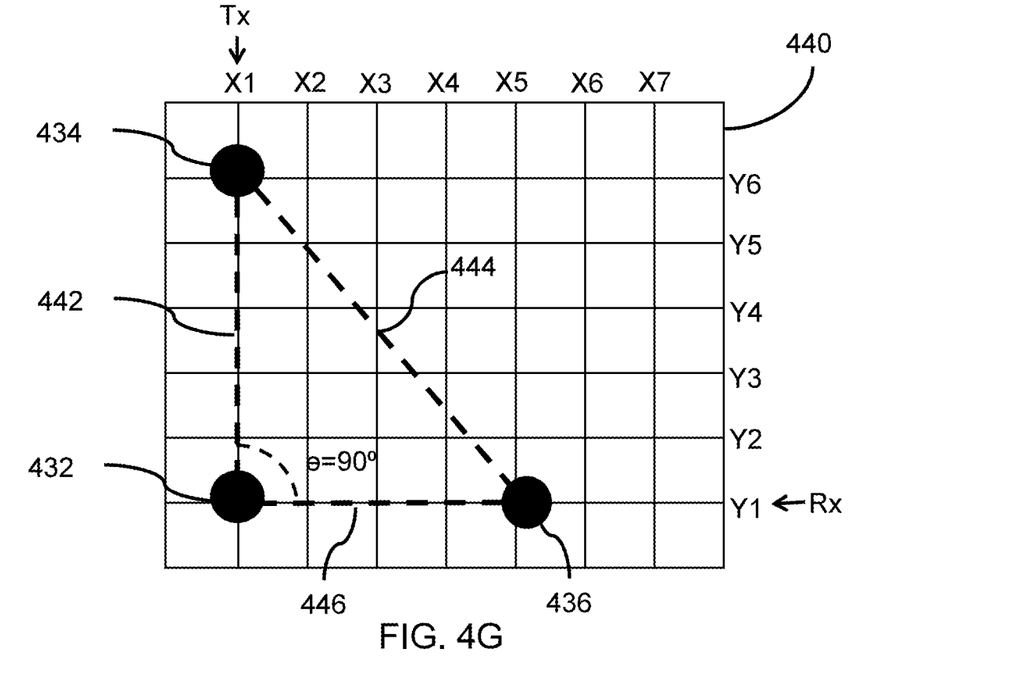
FIG. 4G shows an arrangement of an object on the touch surface in accordance with an example embodiment.

When the object 450 is placed in proximity to a touch surface in the coordinates as shown in FIG. 4G (i.e. both conductive pads 432 and 434 are located on the same X grid wire, while both conductive pads 432 and 436 are located on the same Y grid wire), the conductive pad 432 cannot be detected by the touch surface for the same reason as explained in FIGS. 4C and 4D.

Figure 4H:
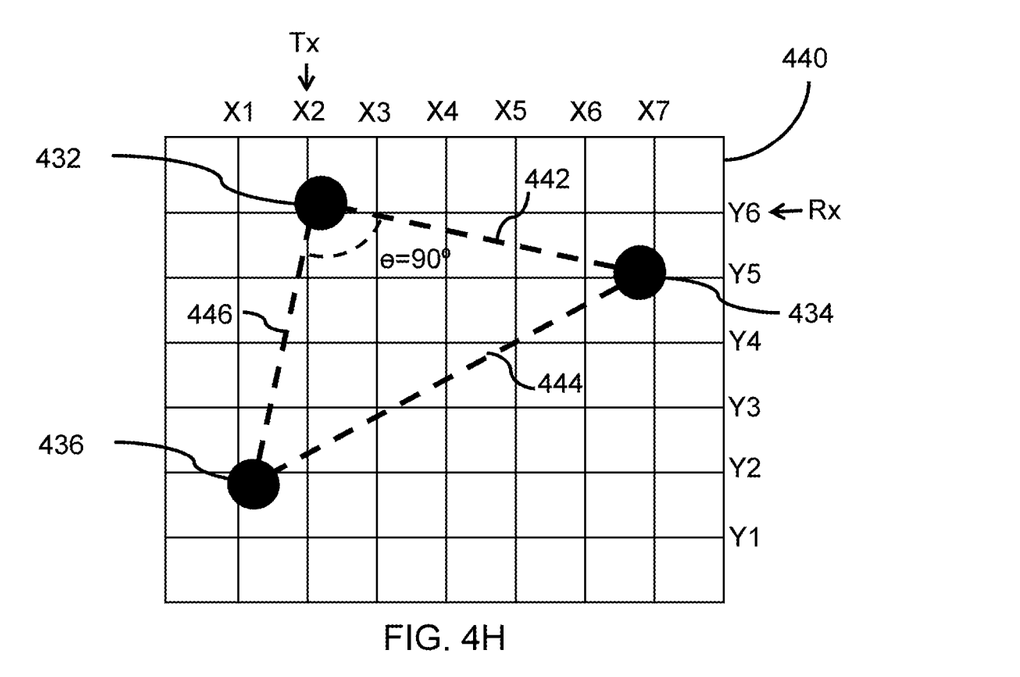
FIG. 4H shows an arrangement of an object on the touch surface in accordance with an example embodiment.

FIG. 4H shows an alternative arrangement of the three conductive pads 432, 434 and 436 on the touch surface 440 in accordance with an example embodiment.

In FIG. 4H, the same object 450 as described in FIGS. 4E and 4F is placed in proximity to the touch surface in an alternative manner as illustrated. In this situation, the coordinates of all three conductive pads 432, 434 and 436 can be determined by the touch surface because all three conductive pads are located on different X and Y grid. For conductive pad 432, the positive charges can be directed away to the conductive pads 434 and 436. Thus the negative charges at conductive pad 432 distorts the electrical field at the intersection of X2-Y6 grid wire pair which triggers a touch event. Similarly, conductive pads 436 and 434 can also be detected when their corresponding grid wires near these pads are activated.

Figure 5A:
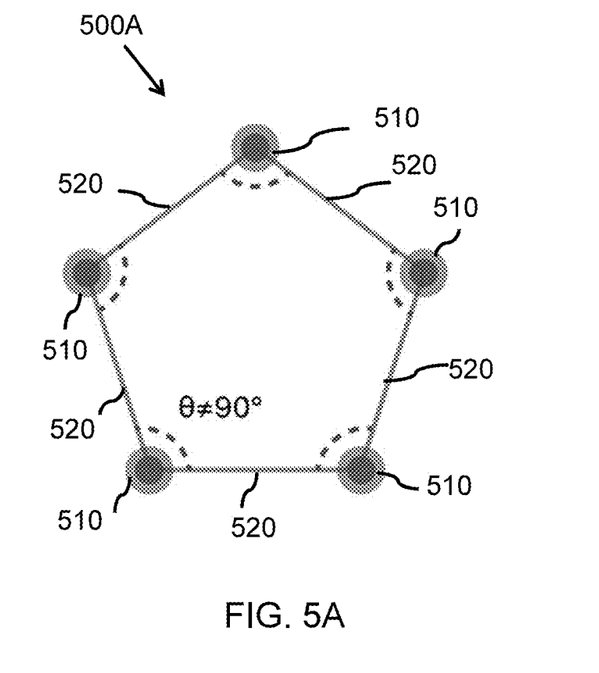
FIG. 5A-5D show geometric patterns of the conductive pads in accordance with an example embodiment.
Figure 5B:
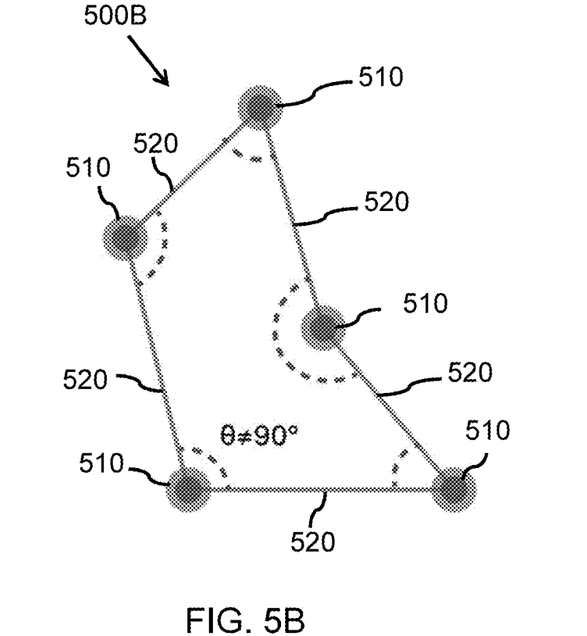
Figure 5C:
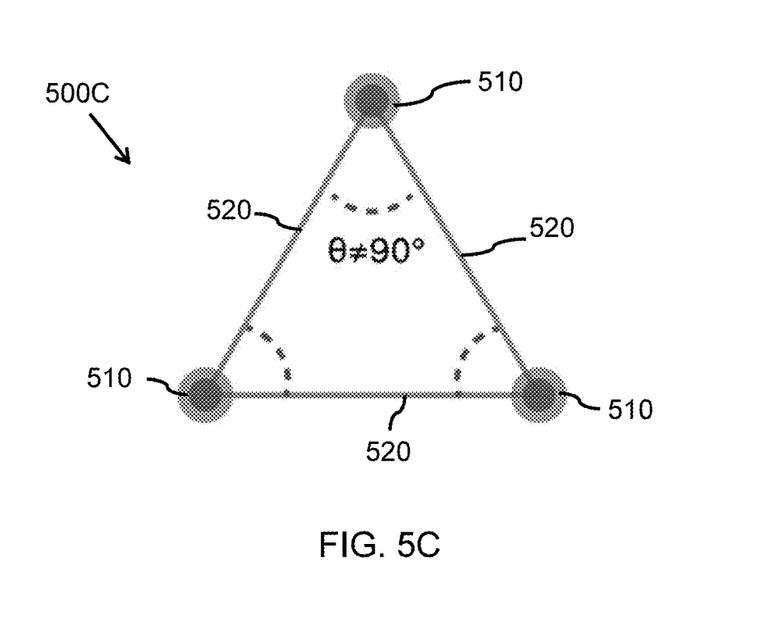

FIGS. 5A, 5B and 5C show arrangements 500A, 500B and 500C of the conductive pads in accordance with example embodiments.

By way of example, the conductive pads 510 interconnected with one another by the conductive lines 520 form geometric patterns that corresponds to a unique identification of an object. By way of example, the geometric patterns formed by the geometric arrangement of all conductive pads can be of various shapes, such as a triangle, quadrilateral, pentagon, hexagon, etc. As long as the triangle formed by any three of the conductive pads is not a right triangle, i.e., there is no right angle in the triangle, all the conductive pads can be detected as explained previously.

Figure 5D:
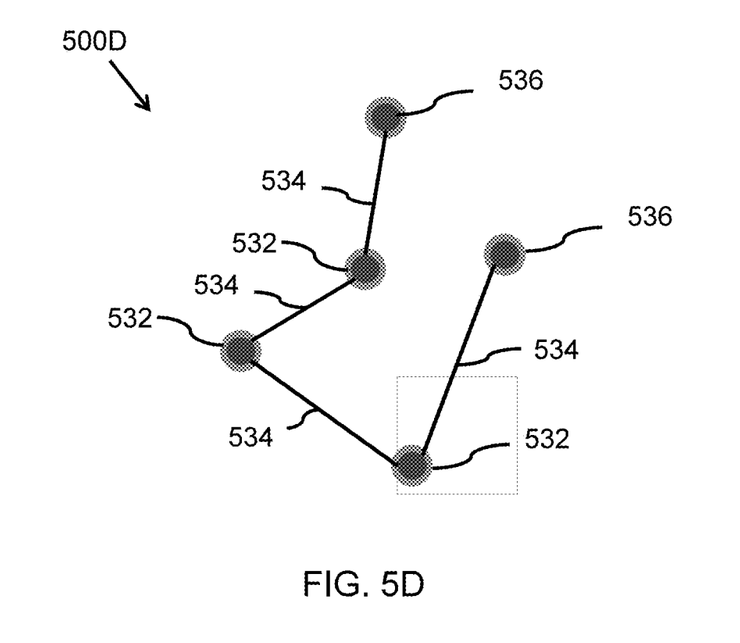

FIG. 5D shows an arrangement 500D of the conductive pads 532 and 536 in accordance with an example embodiment. A geometrical pattern with an open shape is formed by the conductive pads 532 and 536 interconnected with one another by the conductive lines 534, in which each conductive pad 532 is connected with two conductive lines and each conductive pad 536 is connected with a single conductive line. Again, as long as the triangle formed by any three of the conductive pads is not a right triangle, all the conductive pads can be detected as explained previously.

In one example embodiment, the pattern is changeable when one or more switches (not shown) switch between the open state and the closed state. Each switch is disposed between the two ends of each conductive line. The geometric pattern changes when one or more switches switch from open state to closed state or vice versa. A user or electronic device is thus able to change an identity or information stored on a substrate by turning on and off one or more switches. Each unique pattern or switching configuration on the substrate can be associated with a unique identity or representing unique information.

Figure 6:
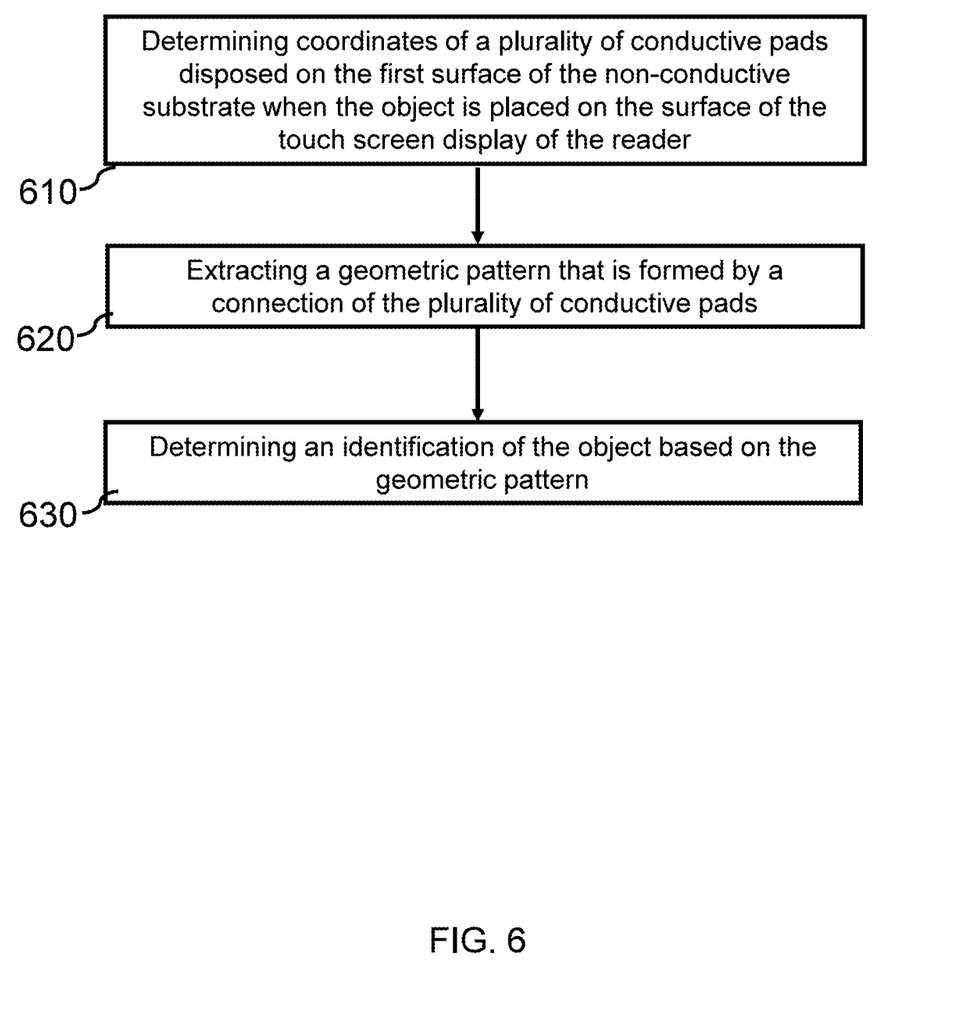
FIG. 6 shows a method for determining an identification of an object with geometric patterns in accordance with an example embodiment.

FIG. 6 shows a method for determining an identification of an object with geometric patterns in accordance with an example embodiment.

Block 610 states determining coordinates of a plurality of conductive pads disposed on the first surface of the non-conductive substrate when the object is placed on the surface of the touch screen display of the reader.

By way of example, the object comprises a non-conductive substrate, a plurality of conductive pads, a plurality of conductive lines and a plurality of conductive vias. The non-conductive substrate has a first surface, and a second surface opposite to the first surface. The conductive pads are disposed on the first surface of the substrate. The conductive lines are disposed on the second surface of the substrate, each conductive line having two ends. The conductive vias extend through the non-conductive substrate from the first surface to the second surface. Each conductive via connects one conductive pad with at least one conductive line so that each conductive pad is electrically connected with one another. When the first surface of the object is placed in proximity to the surface of the touch screen display, the electric field at coordinates of the touch screen display that are in contact with or in proximity to the conductive pads is changed. The reader recognizes the change in electric field and determines the coordinates of the conductive pads disposed on the substrate, each at a time.

Block 620 states extracting a pattern that is formed by a connection of the plurality of conductive pads.

Consider an example in which a geometric pattern of conductive pads disposed on the substrate activates a plurality of X-Y grid locations on the touch screen display of a reader. The reader receives these activated grid locations and recognizes the geometric pattern based on the coordinates of the conductive pads on the touch screen display.

Block 630 states determining an identification of the object based on the pattern.

Consider an example in which the geometric pattern is recognized by a reader. The reader then compares this geometric pattern against those stored in its memory store to find a closest match. The corresponding label of this closest match is regarded as the identity of the object. This identification can also be based on which grid locations were not activated.

In one example embodiment, the processor in the reader further conveys the information stored in the object to the reader, for example, by forming different geometric patterns through switching the one or more switches between the open state and the close state.

Figure 7:
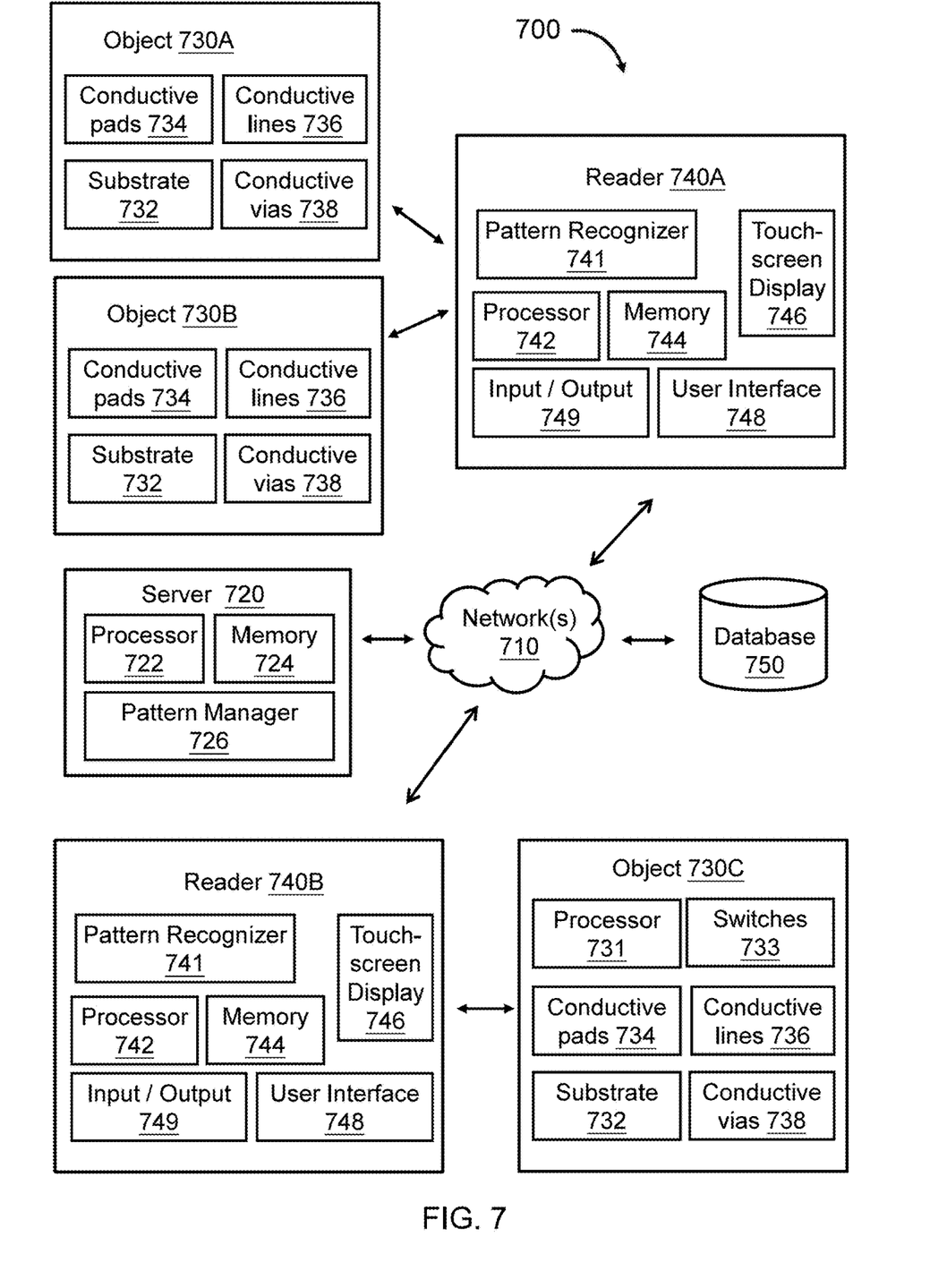
FIG. 7 shows a system for determining identifications of objects in accordance with an example embodiment.

FIG. 7 shows a system 700 for determining identifications of objects in accordance with an example embodiment. The system 700 includes a server 720, a database 750, objects 730A, 730B and 730C, and readers 740A and 740B. One or more elements in the system 700 can communicate with each other through one or more networks 710.

The networks 710 can include one or more of the internet, an intranet, an extranet, a cellular network, a local area network (LAN), a Wi-Fi network, a home area network (HAN), metropolitan area network (MAN), a wide area network (WAN), a Bluetooth network, public and private networks, etc.

The server 720 includes a processor 722 that communicates with a memory 724 and a pattern manager 726. By way of example, the processor 722 can be a microprocessor, central processing unit (CPU), or application-specific integrated circuit (ASIC) for controlling and/or receiving instructions or data from the memory 724 (such as random access memory (RAM), read only memory (ROM), and/or firmware). By way of example, the pattern manager stores a plurality of substrate patterns and/or information associated with unique identities of the substrates.

The objects 730A, 730B and 730C each includes a non-conductive substrate 732 having a first surface and a second surface opposite to the first surface, a plurality of conductive pads 734 disposed on the first surface of the substrate, a plurality of conductive lines 736 disposed on the second surface of the substrate, and a plurality of conductive vias 738 that extends through the substrate from the first surface to the second surface. Each conductive via 738 connects one conductive pad 734 with at least one conductive line 736 so that each conductive pad is electrically interconnected with one another. The conductive pads 734 together form patterns that are identifiable by the readers 740A and 740B. The object 730C further includes one or more switches 733 and a processor 731. The switches 733 are switchable between an open state and a closed state, and the processor 231 is connected with the one or more switches 733.

By way of example, the processor 731 that is connected with the one or more switches 733 is configured to send control signals to each switch for switching them between open and closed states. As such, the processor 731 can then create different geometric patterns by toggling these switches, and each geometric pattern may represent certain information to be sent to the reader.

The reader 740A and 740B each includes a controller or processor 742 that communicates with a pattern recognizer 741, a memory 744, a touch screen display 746, a user interface 748 and an input/output (I/O) 749. By way of example, the pattern recognizer 741 reads the patterns formed on the surface of at least one object when the object is in contact with or in proximity to the touch screen display 746. As one example, the pattern recognizer 741 of reader 740B compares the pattern that is read with pre-stored patterns in a database to determine the identity of the object 730C. As another example, the pattern recognizer 741 of reader 740A recognizes the patterns of objects 730A and 730B placed in proximity to the touch screen display to determine the identity of each object and its coordinates on the touch screen display.

As an example, the processor 741 retrieves an identity of the object based on the patterns recognized by the pattern recognizer 741. Once the object is identified, the processor 742 retrieves information associated with the identity. In an example embodiment, the user interface 748 displays data or images associated with the identity. In another example embodiment, the user interface 748 activates, executes or grants a user access to a software program or applications associated with the identification.

The conductive pads mentioned in the present disclosure can be of various shapes, including but not limited to, one or more of a square, a circle, a triangle, a star and other polygonal shapes. By way of example, the conductive pad has a circular shape with a diameter not less than 10 millimeters, which allows a sufficient area to couple with the touch screen device. Further one of ordinary skilled in the art will appreciate that these example dimensions apply to other shapes, such as triangles, squares, pentagons, ovals, ellipses, and other polygonal shapes and non-polygonal shapes.

In the present disclosure, the term "object" is used to refer to the device that includes non-conductive substrate in combination with the components described herein, and does not imply a particular size or shape. The object may take various shapes and can be embodied or included with various types of electronic and non-electronic devices. By way of example, the object can be shaped as a flat or planar card. As another example, the object can be included with or embedded in product, such as embedded in a smartphone, embedded in a toy, attached to a cover or case, woven into fabric of an article of manufacture, etc. By way of example, the object in the example embodiments can be used in many fields, such as gaming, ticketing, member identifications, counterfeit protections, and other technological fields. As yet another example, the card can have various sizes and shapes, such as being curved or bent or foldable. The size and shape of the object can also vary depending on, for example, the number and types of conductive pads, the location where the substrate will be used, whether the substrate includes switches, a processor or controller, etc.

In the present disclosure, a "conductive pad", "conductive via" and "conductive line" are made of materials that allow the flow of electricity. Examples of a conductive material include, but are not limited to, copper, silver, gold, aluminum, zinc, nickel, brass, conductive ink, and other conductive material (such as other metals, graphite, polymers, and semiconductors).

As used herein and in the claims, "connect" refers to electrical coupling or connection either directly or indirectly via one or more electrical means unless otherwise stated.

As used herein and in the claims, "in proximity to" refers to either in contact with or in close proximity to.

As used herein and in the claims, the terms "touch surface" refers to a capacitive touch screen.

As used herein and in the claims, the term "reader" refers to a device that includes a touch screen display.

As used herein and in the claims, the term "conductive" refers to electrically conductive.

As used herein and in the claims, the term "distance" refers to linear distance between two endpoints.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A device, comprising:
a non-conductive substrate that comprises an external surface; and at least one touchpoint, wherein the at least one touchpoint comprises:
a conductive pad that is disposed on the external surface; and
a conductive line that comprises a first end and a second end, wherein the first end makes electrical contact with the conductive pad, and the second end is at the opposite side of the external surface and extends spatially away from the first end to a pre-determined distance,
wherein the conductive line is configured to direct positive charges away from the conductive pad to the second end of the conductive line when the external surface of the non-conductive substrate is placed in proximity to a touch surface of a touch screen device, thereby the conductive pad triggers a touch event on the touch surface such that a coordinate of the conductive pad relative to the touch surface is determined,
wherein a dimension of the conductive line is large enough such that the positive charges are sufficiently separated from induced negative charges to trigger the touch event without the need for a user to touch the at least one touchpoint,
wherein a length of the conductive line on the non-conductive substrate is at least 1 cm, and a width of the conductive line is at least 0.1 mm, and
wherein the second end of the conductive line is open-ended such that the second end makes no electrical contact with any object.

2. The device of claim 1,
wherein each touchpoint optionally further comprises a switch that has an open state and a closed state,
wherein the switch is connected between the first end and the second end of the conductive line and near the first end, and
wherein the conductive pad triggers the touch event on the touch surface when the switch is in the closed state and does not trigger the touch event on the touch surface when the switch is in the open state.

3. The device of claim 2, wherein when the external surface of the non-conductive substrate is placed in proximity to a touch surface and at least one switch is in closed state, conductive pads connected with the switch in closed state trigger touch events on the touch surface.

4. The device of claim 2, further comprising:
a processor that is connected to the at least one switch capable of switching the switch from open state to closed state and vice versa.

5. The device of claim 1, wherein the conductive pad has a pre-determined contact area for contacting with the touch surface.

6. The device of claim 1, wherein the conductive pad is in a circular shape with a diameter not less than 6 mm.

7. The device of claim 1, wherein the conductive pad and the conductive line are made of conductive materials and/or high relative permittivity materials.

8. The device of claim 1, wherein the second end of the conductive line is not connected with any other conductive pads.

9. An object, comprising:
a non-conductive substrate that comprises an external surface;
a plurality of conductive pads that are disposed on the external surface of the non-conductive substrate; and
a plurality of conductive lines that are disposed at the opposite side of the external surface,
wherein each conductive line comprises two ends, and one end of the conductive line is connected with one conductive pad and the other end of the conductive line is open-ended such that the other end makes no electrical contact with any object,
wherein each conductive pad is capable of triggering a touch event when the external surface of the non-conductive substrate is placed in proximity to a touch surface such that a geometric pattern formed by the geometric arrangement of all conductive pads can be identified based on the coordinates of the conductive pads on the touch surface,
wherein a dimension of the conductive lines is large enough such that positive charges are sufficiently separated from induced negative charges to trigger the touch event without the need for a user to touch the conductive pads or the conductive lines, and
wherein a length of the conductive lines on the non-conductive substrate is at least 1 cm, and a width of the conductive line is at least 0.1 mm.

10. The object of claim 9, further comprising:
a plurality of conductive vias, each conductive via extending through the non-conductive substrate, and electronically connecting one conductive pad with at least one conductive line.

11. The object of claim 10, further comprising:
a processor that is connected with the at least one switch and is configured to send control signals to each switch for switching the switch from open state to closed state and vice versa.

12. The object of claim 9, further comprising:
at least one switch, each switch capable of switching between an open state and a closed state and disposed between the two ends of each conductive line.

13. The object of claim 9, wherein the conductive pad has a pre-determined contact area for contacting with the touch surface.

14. A method executed by a reader to identify an object wherein the object comprises a non-conductive substrate that has an external surface, the method comprising:
determining, by the reader, coordinates of a plurality of conductive pads disposed on the external surface of the non-conductive substrate without the need for a user to touch the conductive pads when the external surface is placed in proximity to the surface of the touch screen display of the reader;
extracting, by the reader, a geometric pattern formed by the geometric arrangement of the plurality of conductive pads on the external surface of the non-conductive substrate; and
determining, by the reader, information stored in the object based on the geometric pattern,
wherein each conductive pad in the object is connected to one or more conductive lines disposed on a top surface through a conductive via that extends from the external surface to the top surface,
wherein a dimension of the conductive lines is large enough such that positive charges are sufficiently separated from induced negative charges to trigger a touch event without the need for a user to touch the conductive pads or the conductive lines,
wherein a length of the conductive lines on the non-conductive substrate is at least 1 cm, and a width of the conductive line is at least 0.1 mm, and
wherein one end of the conductive line is connected with one conductive pad and the other end of the conductive line is open-ended such that the other end makes no electrical contact with any object.

15. The method of claim 14, wherein the object further comprises one or more switches, each having an open state and a closed state and disposed on the conductive line.

16. The method of claim 15, wherein the object further comprises a processor that is connected with the switches, the method further comprising:
switching, by the processor, the one or more switches from open state to closed state and vice versa.

17. The method of claim 14, further comprising:
using the stored information as an identity of the object; and
displaying, by the reader and on the touchscreen display of the reader, the identity of the object.

* * * * *